United States Patent [19]

Misson

[11] Patent Number: 5,655,440

[45] Date of Patent: Aug. 12, 1997

[54] METHOD AND APPARATUS FOR MANUFACTURING MOZZARELLA CHEESE

[76] Inventor: Gregory Charles Misson, 35 Campbell Street, Leamington, Cambridge 2351, New Zealand

[21] Appl. No.: 424,457

[22] PCT Filed: Oct. 26, 1993

[86] PCT No.: PCT/NZ93/00103

§ 371 Date: Apr. 27, 1995

§ 102(e) Date: Apr. 27, 1995

[87] PCT Pub. No.: WO94/09615

PCT Pub. Date: May 11, 1994

[30] Foreign Application Priority Data

Oct. 28, 1992 [NZ] New Zealand ............... 244917

[51] Int. Cl.$^6$ .................................................. A23C 19/02
[52] U.S. Cl. ........................ 99/452; 99/450.6; 99/450.7; 99/454; 99/455; 426/582
[58] Field of Search ............... 99/450.6, 450.7, 99/454, 455, 452; 426/582, 516, 491, 495, 524

[56] References Cited

U.S. PATENT DOCUMENTS

| 3,468,026 | 9/1969 | Robertson et al. | 99/454 |
|---|---|---|---|
| 3,805,689 | 4/1974 | Berger et al. | 99/461 |
| 4,112,835 | 9/1978 | Mongiello | 99/455 |
| 4,332,831 | 6/1982 | Rust | 426/582 |
| 4,824,682 | 4/1989 | Morrison | 426/582 |
| 5,324,529 | 6/1994 | Brockwell | 426/392 |

FOREIGN PATENT DOCUMENTS

| 9322903 | 11/1993 | WIPO | 99/452 |
|---|---|---|---|

OTHER PUBLICATIONS

Kosikowski, F. 1996. Cheese and Fermented Milk Foods. Edward Brothers, Inc. Ann Arbor Michigan, p. 396.

*Primary Examiner*—Helen Pratt
*Attorney, Agent, or Firm*—Young & Thompson

[57] ABSTRACT

An apparatus and method for manufacturing mozzarella cheese. Cheese curd is cooked and stretched in a heated water bath (2), augers (3) mounted therein transporting the curd therethrough to an outlet (8). The outlet (8) conjoins with a conduit (7), controlled by valves (9), to provide a pressurized supply of curd to a bank of fill-heads (10). Each fill-head (10) includes two volumetric metering compartments (13) which provide a dual discharge at an outlet (12) thereof. Hoops (14) are placed at the outlets (12) to be charged from the fill-heads (10). A hoop (14) can have a divider (19) inserted therein to divide the hoop (14) into two compartments (20 and 21) corresponding to those of the fill-heads (10). Before charging plastic liner bags (50) are placed in each hoop (14) or hoop compartment (20 and 21) as appropriate. The liners (50) are subsequently vacuum sealed and then immersed while in their loops (14) in a cooling bath (32). After the cheese has sufficiently solidified the hoops (14) are unloaded from the bath (32) and the sealed cheese blocks (47) removed from the hoops.

14 Claims, 3 Drawing Sheets

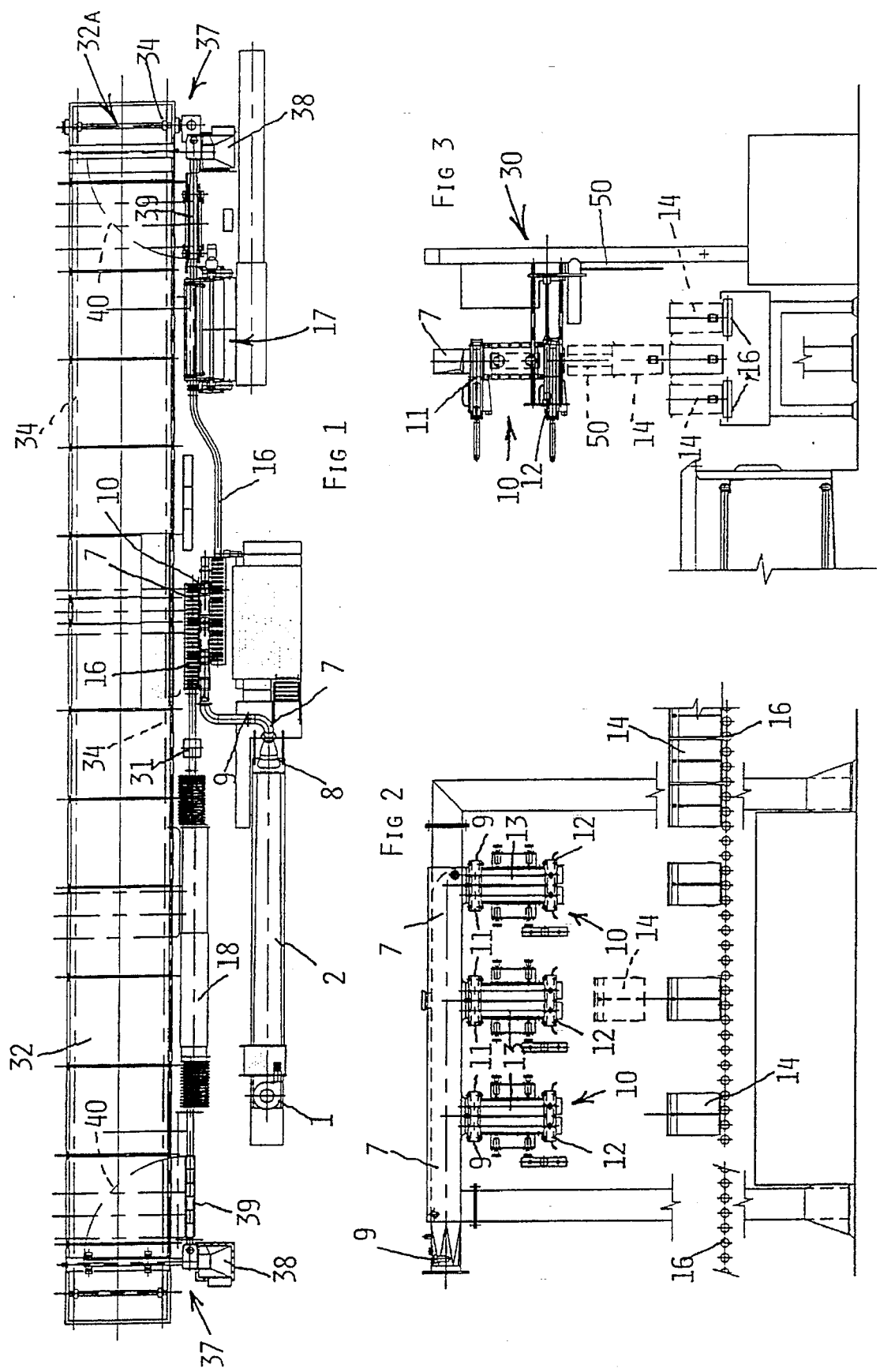

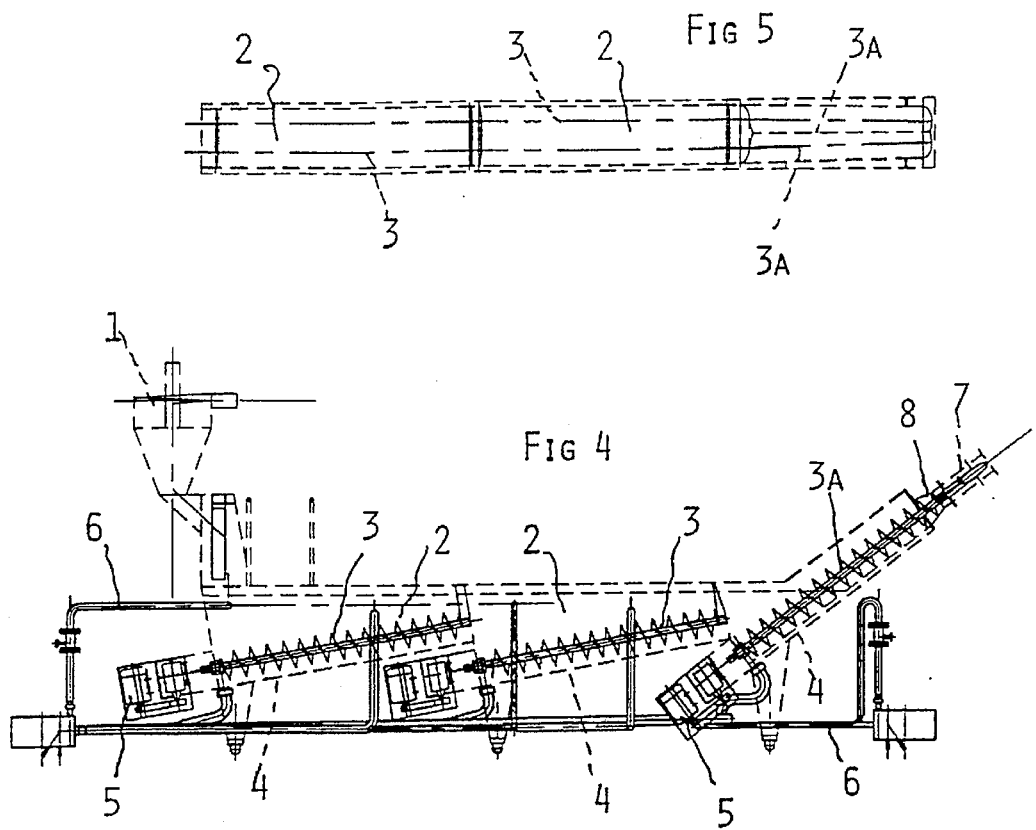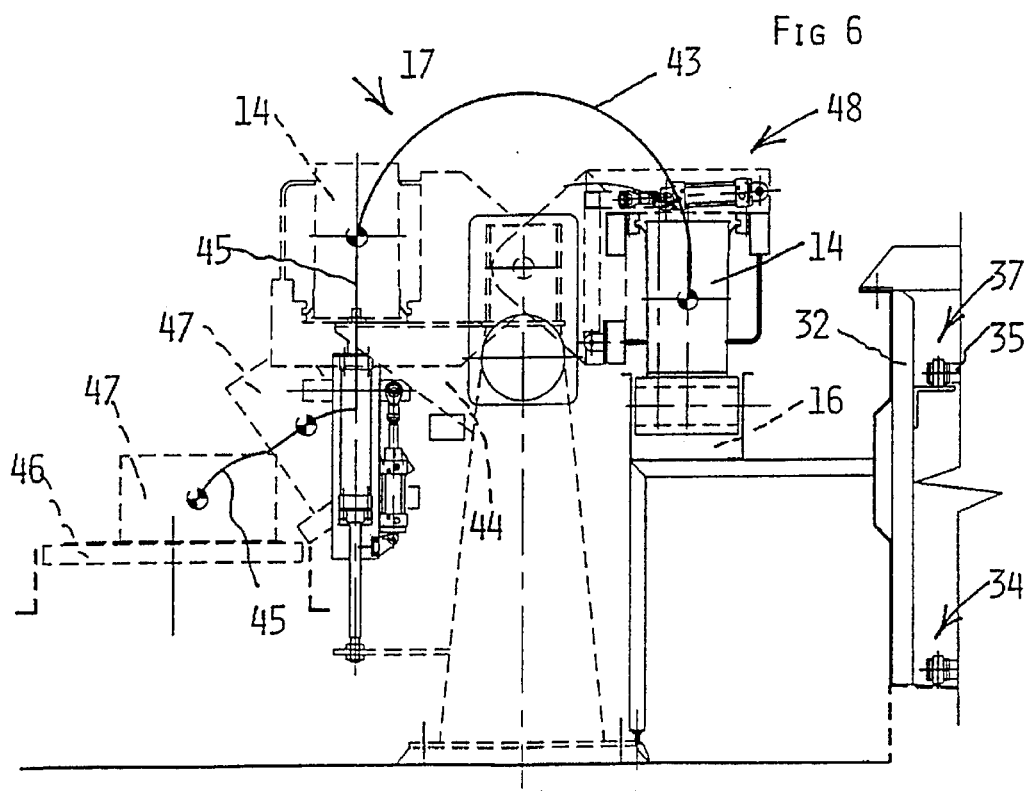

METHOD AND APPARATUS FOR MANUFACTURING MOZZARELLA CHEESE

TECHNICAL FIELD

This invention relates to an improved method and an improved apparatus for the substantially continuous production of mozzarella cheese.

BACKGROUND ART

The production of mozzarella cheese requires cheese curd to be appropriately prepared by the cooking and stretching thereof prior to solidification as a cheese block. Solidification is achieved and/or accelerated by cooling, one cooling method involving immersion of the cheese curd in a brine solution. A brine solution is necessary or at least preferred to water as bacterial problems can arise with the latter. It is also known to cool cheese curd in a cooling room but this is not considered cost-effective and (ends to take longer than a cooling bath.

A first intention of this invention is to provide a method and an apparatus for the substantially continuous production of mozzarella cheese which will overcome and/or avoid problems which arise with known methods and apparatus or at least provide a useful choice thereto.

Also, for marketing reasons with the production of mozzarella cheese it is desirable to be able to produce the cheese blocks in at least two sizes, traditionally 10 kg and 20 kg blocks and a further intention of this invention is to provide a production method and an apparatus to readily achieve this end.

It is also envisaged that some of the steps involved in the method of this invention may be suitable for utilisation on their own or with other, but not all, of the steps of this method in other methods of manufacturing mozzarella cheese. Similarly some of the features of the apparatus may be so utilised with known mozzarella cheese apparatus. Further, some of the apparatus features and aspects described herein may well be suitable for utilisation in the production of other products.

DISCLOSURE OF INVENTION

According to a first aspect of this invention there is provided a method of manufacturing mozzarella cheese comprising the steps of feeding appropriately cooked and stretched cheese curd to a hoop fill-head, positioning a hoop adjacent an outlet of the fill-head anal placing a liner in the hoop prior to charging the liner with curd from the fill-head, vacuum sealing the liner and then immersing the so charged liner in a cooling bath until the curd has reached a required degree of solidity and then removing the resultant cheese block from the cooling bath.

According to a second aspect of this invention there is provided a method of manufacturing mozzarella cheese as described in the preceding paragraph wherein the method is carried out in a substantially continuous sequential manner, a plurality of hoops each being cyclically returned to the fill-head and a fresh liner placed therein prior to charging from the fill-head, an essentially continuous supply of curd being fed to the fill-head.

According to a third aspect of this invention there is provided a method of manufacturing mozzarella cheese as described in either of the two preceding paragraphs wherein a series of augers are mounted end to end in the bath, the augers being mounted in an inclined stepped configuration in conformity to an associated inclined stepped floor of the bath, each auger other than the last being disposed to discharge curd down onto the next auger.

According to a fourth aspect of this invention there is provided a method of manufacturing mozzarella cheese as defined in any one of the three preceding paragraphs wherein a plurality of fill-heads are provided, the fill-heads being supplied under pressure from the one common conduit and being adapted to be operated out of phase of one another to help maintain the supply of curd thereto at a constant pressure.

According to an fifth aspect of this invention there is provided an apparatus for manufacturing mozzarella cheese comprising means to appropriately cook, stretch and feed cheese curd to a fill-head, a hoop adapted to hold a liner and means to dispose the lined hoop adjacent an outlet of the fill-head as to receive a charge therefrom, vacuum sealing means to seal a so charged liner, and cooling bath means in which to immerse a charged liner to solidify the curd.

According to a sixth aspect of this invention there is provided an apparatus for manufacturing mozzarella cheese as defined in the preceding paragraph wherein the or each fill-head is divided into at least two adjacently separated compartments each compartment presenting a discharge to a common outlet of the fill-head.

According to a seventh aspect of this invention there is provided in an apparatus for manufacturing mozzarella cheese a means for cooking and stretching the cheese curd comprising a heated water bath wherein at least one auger is mounted to transport and stretch the curd therethrough to an outlet, at least a section of the floor of the bath adjacent the outlet being inclined up toward the outlet, the outlet being disposed clear of the water and the auger also raising the curd clear of the water whereby the curd can drain prior to the curd entering the outlet.

According to an eighth aspect of this invention there is provided in a method of manufacturing mozzarella cheese a stage of cooling the curd comprising charging the curd into liners, sealing the liners and transporting the liners through a cooling bath until the curd appropriately solidifies.

BRIEF DESCRIPTION OF THE DRAWINGS

FIG. 1 is plan lay-out view partly schematic of the apparatus, and

FIG. 2 is a side elevation of a bank of three hoop fill-heads, and

FIG. 3 is an end view partly in cross-section of a fill-head, and

FIG. 4 is a side view, partly schematic, of a curd cooking and stretching bath with a near side removed for clarity and FIG. 5 is a schematic plan view of the bath of FIG. 4 depicting the interrelationship of the stretching elements thereof, and FIG. 6 is an end of a dehooping apparatus, including an operation-path depicted schematically thereon.

BEST MODE FOR CARRYING OUT THE INVENTION

Figure 8:
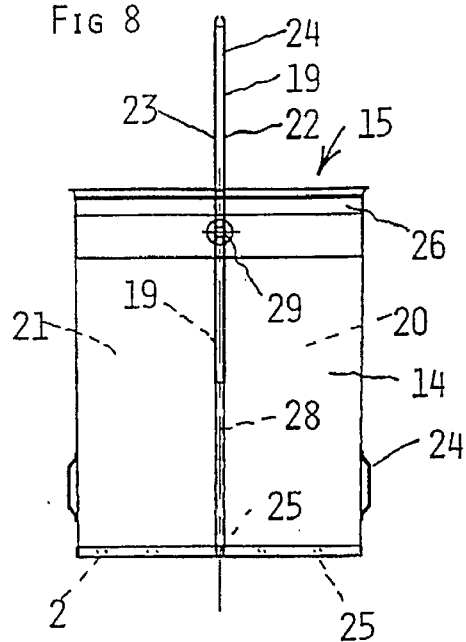
FIG. 8 is a side view of a hoop with a divider partly installed therein.

In conventional manner cheese curd is prepared to provide a substantially continuous supply, such as by hopper 1 to the cheese block forming apparatus of this invention as depicted schematically in FIG. 1. As a first phase and as required the cheese curd is cooked and stretched preferably in a heated water cooker 2. The cheese curd is passed therethrough by a series of augers 3, the cooker 2 and augers 3 providing the required cooking and stretching of the cheese curd. Preferably two series of augers 3 are provided, each series comprising three inclined augers 3 arranged end to end. The floor 4 of cooker 2 is arranged with inclined stepped stages corresponding to the augers 3. Referring in particular to FIG. 4, curd is passed left to right and at the end of the first two stages deposited down onto the next stage auger 3. Referring to FIG. 5, the first two stages of the two series of augers 3 are disposed in parallel and at the third stage the augers 3 are angled toward one another as described in more detail hereinafter. (In FIG. 5 the axis of rotation of the augers 3 are depicted by the line 3). Preferably hydraulic or pneumatic motors 5 or similar are utilised to rotate the augers 3. Preferably the water of the cooker 2 is re-cycled and filtered, suitable apparatus therefor being indicated generally by pipework 6.

The first two augers 3 operate substantially fully submerged and at the last stage the augers 3 raise the curd from the cooking bath 2. Preferably the raising is carried out by the pair of meshing augers 3a which lift the curd clear of cooker 2 in so doing allowing the curd to drain, the augers 3a conveying the drained curd into a conduit 7. As depicted in FIG. 1, an inlet 8 to the conduit 7 is preferably of a reducing volumetric capacity and preferably valve and associated control means (indicated generally at 9 and discussed further below) are provided at the start of conduit 7 to achieve a pressurised supply of cheese curd within the conduit 7. Throughout the apparatus known automatically operable valve and associated controls including sensors are utilised and for convenience herein they are referred to as valve means 9. Preferably the reduction of conduit inlet 8 is achieved by forming it in a reducing frustro-conical shape with the associated discharge ends of the augers 3a being corresponding shaped and disposed to operate therewithin.

Conduit 7 leads to at least one, and preferably a plurality of hoop fill-heads 10, three fill-heads 10 being depicted in the attached drawings. A fill-head 10 is provided with valve means 9 at both an inlet 11 thereto and a discharge outlet 12 therefrom. Thus cheese curd within the conduit 7 is maintained at a pressure dictated by the feeding augers 3. A valve and control means 9 are utilised to monitor the pressure in conduit 7 to provide "feed-back" information to control the rate of feed into the cooker 2 and the feed rate of the augers 3. The object is to provide a continuous supply of cheese curd at a substantially constant pressure to the fill-heads 10. Thus as the pressure in conduit 7 increases the rate curd is feed thereinto is reduced. Preferably the inlet 11 and outlet 12 valve means 9 of a fill-head 10 are in the nature of horizontally acting gate-valves which operate to enable charging and dis-charging of a fill-head 10. Preferably each fill-head 10 comprises two adjacent compartments 13 each of a volume commensurate to a required weight of a cheese block. Thus in the traditionally requirement each has a volume equating to a 10 kg block. This enables the formation of two separate 10 kg blocks or one 20 kg block within a fill-head 10, each compartment 13 presenting a discharge to the common outlet 12 of a fill-head 10. A fill-head 10 is the subject of our co-pending New Zealand Patent Application (in New Zealand Number 244918) and is described in more detail therein.

The fill-heads 10 are fed from conduit 7 and are operated out of phase of one another to balance the draw-off from conduit 7 enabling the pressure therein to be kept more constant. The fill-heads 10 charge hoops 14 in which cheese blocks 47 are formed, preferably a plurality of hoops 14 being provided. The hoops 14 are conveyed throughout the apparatus, as hereinafter described, to provide a cyclic substantially continuous processing or production method.

Referring to FIGS. 1, 2 and 3, conveyor means 16 returns empty hoops 14 from a dehooping apparatus 17 and after charging conveyor means 16 transports the hoops 14 to vacuum sealing means 18. The conveyor means 16 is disposed lower than the fill-heads 10 and provides an entry for hoops 14 from one side thereof. Hoops 14 are shunted laterally to be beneath a fill-head 10 and then raised to be closer to and in alignment with an outlet 12 of a fill-head 10 in readiness to receive a liner 50 for charging. After charging hoops 14 are lowered and shunted to the other side of the fill-heads 10 for transport to the sealing means 18.

The conveyor means 16 leading to the sealing means 18 preferably includes a weight checking means 31 incorporating an "incorrect weight" reject mechanism. The conveyor means 16 at the entry to the sealing means 18 is adapted to register the orientation of hoops 14 entering thereinto to determine whether one or two sealing lines per liner 50 are required to be sealed. The need for this arises as liners 50 can be disposed in hoops 14 in two different modes as more particularly described below.

Figure 9:
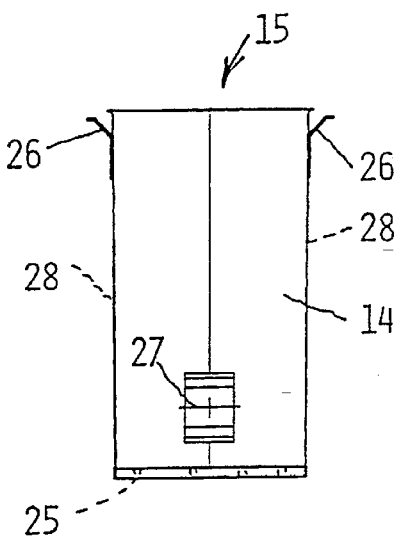
FIG. 9 is an end view of the hoop.

A hoop 14 is preferably fabricated from suitable metal such as stainless steel to be a nominal and traditionally rectangular block form equivalent to a 20 kg capacity. Referring in particular to FIGS. 8 and 9, each hoop 14 has an open top 15 and is preferably adapted such as by internal side grooves 28 to take a removable divider 19. Divider 19 can be disposed longitudinally therein to form two separate compartments 20 and 21 each of a 10 kg capacity. Preferably a divider 19 comprises a pair of adjacently spaced apart side plates 22 and 23 disposed to form an open ended, top and bottom void 24 therebetween. Preferably suitable snap-fastener means 29 are provided to retain a divider 19 within a hoop 14. Apertures 25 are formed in the bottom of a hoop 14 including in the region thereof aligning with the void 24 of a divider 19 inserted into a hoop 14. Support brackets 26 are also provided on the outside of a hoop 14 as are spacers 27. The purpose of these features of a hoop 14 will be apparent from the following description.

Each hoop 14 or in the alternative each compartment 20 and 21 thereof is adapted to support a liner 50. Preferably liners 50 in the nature of bags formed from suitable plastics material are placed therein manually or by or from a suitable bag loading apparatus 30. Thus a charge from a fill-head 10 to a hoop 14 is deposited within a liner bag 50. Should it be desired to form 20 kg blocks then hoops 14 without dividers 19 are utilised with one liner bag 50 to each hoop 14. Should it be desired to form 10 kg blocks then hoops 14 with dividers 19 in place and liner bags 50 in each compartment 20 and 21 thereof are utilised. Thus the vacuum sealing means 18 as mentioned above is adapted to provide for sealing of one or two liners 50 per hoop 14.

The vacuum sealing apparatus 16 operates in substantially known manner preferably to seal the liners of a batch, say 5, hoops 14 at a time. Following sealing so charged hoops 14 are placed in a cooling bath 32. Bath 32 preferably contains substantially non-salted or similarly treated water (indicated by line 33) and mounted therein is a continuous conveyor chain and track (indicated generally at 34) supporting transverse parallel rails 35 at "hoop spaced" intervals throughout. Batches of hoops 14 are placed in the cooling bath 32, the conveyor 32 providing for the complete immersion of the hoops 14 and more particularly the sealed cheese blocks 47 therein within the bath 32. Hoops 14 are suspended between adjacent bars 35 on brackets 26, the spacers 27 creating a gap between adjacent hoops 14. The apertures 25 in the bottom of a hoop 14 assist immersion thereof by avoiding flotation of a hoop 14 and enable the water 33 of the bath 32 to readily disperse completely about the sides of the hoops 14 including within the void 24 of a divider 19 if utilised. Thus regardless of whether 10 kg or 20 kg sealed cheese blocks 47 are being processed cooling is applied directly about all faces thereof. Bath 32 preferably includes a weir 36 to one side thereof into which the warmed water 33 can spill-over and thus discharge for cooling and re-cycling to maintain the cooling temperature thereof.

Figure 7:
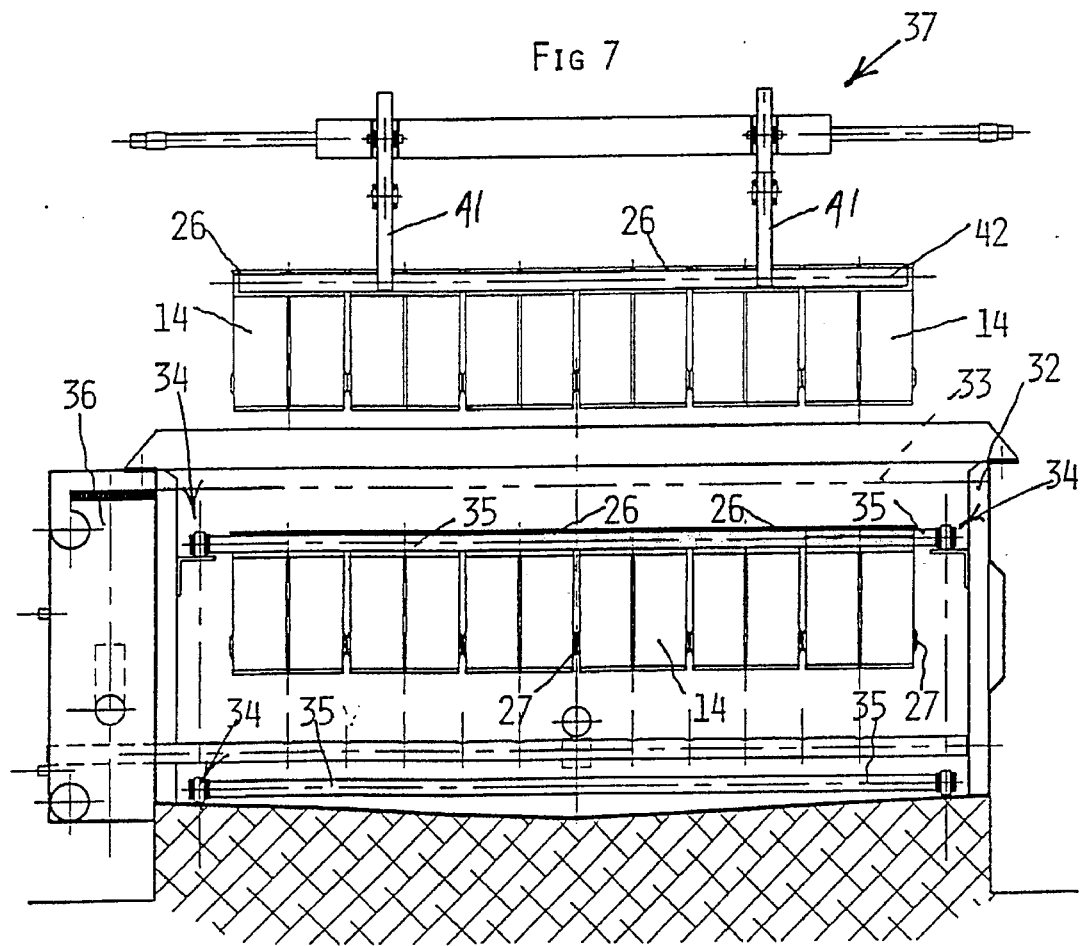
FIG. 7 is a cross-sectional view of a cooling bath of the apparatus including hoisting means for loading and unloading hoops therefrom.

Suitable hoisting means 37 are provided to load and unload hoops 14 from the cooling bath 32. Referring to FIG. 1 hoist 37 preferably includes a turret 38 and associated articulated arm 39 adapted to swing through 90° (indicated by lines 40) to load and unload hoops 14 from bath 32. Referring to FIG. 7, arm 39 supports raising and lowering means 41 carrying two transverse bars 42 the spacing therebetween being laterally adjustable to engage beneath brackets 26 of hoops 14. With release of bars 42 hoops 14 are picked up by bars 35 of conveyor means 34 as aforesaid, the reverse operation applying with unloading of hoops 14 at the exit end 32a of bar 32.

Conveying means 16 transfer the cooled hoops 14 to dehooping apparatus 17 depicted in FIG. 6, the dehooping apparatus 17 inverting each batch of hoops 14 unloaded from the bath 32 so that sealed cheese blocks 47 are dislodged therefrom. Preferably dehooper 17 includes a hoop 14 pick-up clamp device 48 which retains and inverts (indicated by line 43 on FIG. 6) a batch of hoops 14. Clamp 48 dislodges sealed cheese blocks 47 from their hoops 14 preferably onto a platform 44. At this point platform 44 represents a first and uppermost station in the action of dehooper 17. At this station platform 44 initially limits the extent of dislodgment of a sealed cheese block 47 from a hoop 14. Thereafter platform 44 lowers (indicated by two-stage line 45) sealed cheese blocks 47 for deposit such as on a conveying means 46 for dispatch and storage as required. Clamp device 48 replaces the emptied hoops 14 back on conveyor means 16 which directs the so discharged hoops back to the fill-heads 10 for re-charging and thus the cyclic production referred to.

I claim:

1. An apparatus for manufacturing mozzarella cheese comprising means to appropriately cook, stretch and feed cheese curd to a fill-head, a hoop adapted to hold a liner and means to dispose the lined hoop adjacent an outlet of the fill-head as to receive a charge therefrom, vacuum sealing means to seal a so-charged liner, and cooling bath means in which to immerse a charged liner to solidify the curd, wherein conveyor means are provided to enable a plurality of hoops to be cyclicly returned to the fill-head to receive a fresh liner for each charging thereof from the fill-head, the cheese curd feed means being adapted to operate to provide an essentially continuous supply of curd to the fill-head.

2. An apparatus for manufacturing mozzarella cheese as claimed in claim 1, wherein the cooling bath means is adapted to receive a hoop with a sealed charged liner therein, dehooping means being provided after retrieving the hoop from the bath means.

3. An apparatus for manufacturing mozzarella cheese as claimed in claim 1, wherein the cooking means comprises a heated water bath.

4. An apparatus for manufacturing mozzarella cheese as claimed in claim 3, wherein at least one auger is mounted in the bath means to transport the curd therethrough and remove the curd therefrom in so doing providing for the stretching of the curd.

5. An apparatus for manufacturing mozzarella cheese as claimed in claim 4, wherein at least a section of a floor thereof adjacent an outlet from the bath means is inclined up toward an outlet, the outlet being disposed clear of a surface of water in the bath means whereby the curd can drain prior to the curd entering the outlet.

6. An apparatus for manufacturing mozzarella cheese as claimed in claim 5, wherein a series of augers are mounted end to end in the bath means, the augers being mounted in an inclined stepped configuration in conformity to an associated inclined stepped floor of the bath means, each auger other than the last being disposed to discharge curd down onto the next auger.

7. An apparatus for manufacturing mozzarella cheese as claimed in claim 5, wherein two at least partly meshing augers are provided to raise the curd clear of said surface of water to the outlet of the cooker, the outlet being of a reducing volumetric capacity.

8. An apparatus of manufacturing mozzarella cheese as claimed in claim 1, wherein a conduit connects the fill-head to the cooking means, valve means being incorporated in the conduit to enable a pressurized supply of curd to the fill-head.

9. An apparatus for manufacturing mozzarella cheese as claimed in claim 8, wherein pressure in the conduit is generated by the action of an auger, valve and associated control means being included in the conduit to enable the monitoring of the pressure and provide a feed-back to the supply of curd and the action of the auger to inversely relate their rate of operation to that of the pressure in the conduit.

10. An apparatus for manufacturing mozzarella cheese as claimed in claim 9, wherein a plurality of fill-heads are provided, the fill-heads being supplied from the one conduit and being adapted to be operated out of phase with one another to help maintain the supply of curd at a constant pressure.

11. An apparatus for manufacturing mozzarella cheese as claimed in claim 10, wherein each fill-head is divided into at least two adjacently separated compartments each compartment presenting a discharge to a common outlet of the fill-head.

12. An apparatus for manufacturing mozzarella cheese as claimed in claim 1, wherein each hoop has a floor in which aperture are incorporated.

13. An apparatus for manufacturing mozzarella cheese as claimed in claim 12, wherein each hoop is adapted to receive at least one removable longitudinal divider therein to divide the hoop into two adjacent compartments, the hoop being adapted to hold a liner in each compartment.

14. An apparatus for manufacturing mozzarella cheese as claimed in claim 13, wherein the divider includes an open ended void between two dividing walls thereof and at least some of the apertures in the floor of the hoop align with the void.

* * * * *